United States Patent [19]

Jongeling

[11] 4,051,267

[45] Sept. 27, 1977

[54] PROCESS FOR STABILIZING TEA EXTRACT AND PRODUCT

[75] Inventor: Herman Jongeling, Leusden, Netherlands

[73] Assignee: D.E.J. International Research Company B.V., Utrecht, Netherlands

[21] Appl. No.: 762,743

[22] Filed: Jan. 26, 1977

Related U.S. Application Data

[63] Continuation of Ser. No. 613,447, Sept. 15, 1975, abandoned.

[30] Foreign Application Priority Data

Sept. 17, 1974 United Kingdom .............. 40365/74

[51] Int. Cl.$^2$ ................................................ A23F 3/00
[52] U.S. Cl. .................................. 426/330.3; 426/597
[58] Field of Search .............. 426/597, 324, 327, 329, 426/330.3, 575

[56] References Cited

U.S. PATENT DOCUMENTS

| 2,476,072 | 7/1949 | Tressler | 426/597 |
|---|---|---|---|
| 2,963,368 | 12/1960 | Greenbaum | 426/597 |
| 2,971,884 | 2/1961 | Busanac | 426/597 |
| 3,151,985 | 10/1964 | Fobes | 426/597 |
| 3,163,539 | 12/1964 | Barch | 426/597 |
| 3,385,714 | 5/1968 | Smith | 426/575 |
| 3,484,246 | 12/1969 | Moore et al. | 426/597 |
| 3,492,126 | 1/1970 | Rubenstein | 426/597 |
| 3,556,810 | 1/1971 | Moirano | 426/575 |
| 3,619,205 | 11/1971 | LeVan | 426/597 |
| 3,658,556 | 4/1972 | Klein et al. | 426/575 |

FOREIGN PATENT DOCUMENTS

| 1,319,439 | 6/1973 | United Kingdom | 426/597 |
|---|---|---|---|
| 1,204,578 | 9/1970 | United Kingdom | 426/597 |

*Primary Examiner*—Steven L. Weinstein
*Attorney, Agent, or Firm*—Baldwin, Egan, Walling & Fetzer

[57] ABSTRACT

Tea extract is stabilized for use in vending machines and for storage and transport in frozen or chilled condition by the incorporation therein of a carragheenan.

5 Claims, No Drawings

PROCESS FOR STABILIZING TEA EXTRACT AND PRODUCT

This is a continuation of application Ser. No. 613,447, filed Sept. 15, 1975, now abandoned.

The invention relates to an improved process for the preparation of a tea product and is particularly concerned with the production of a tea extract which is suitable for use in an automatic dispensing machine and which can be stored and shipped in frozen or chilled condition.

When tea is brewed in warm or hot water and then chilled, a precipitate or "cloud" will generally form, the effect being known as "creaming". The extent of "creaming down" and the colour of the precipitate are used by professional tea tasters as an additional indication of strength and briskness of the infusion.

Liquid tea extracts, having a substantially higher concentration of soluble tea solids than the beverage normally consumed, exhibit a strong tendency to cloud and produce sediment on storage, especially at low temperatures. When tea extract is kept in an automatic dispensing machine, in which it must be maintained at a low temperature in order to ensure flavour and palatability in the reconstituted beverage, sedimentation of creaming substances will cause uneven dosing and eventually plugging of the dosing system. In addition this will cause uneven quality of the beverage obtained. The sediment consists mainly of complexes of polyphenols and caffeine. The polyphenols impart the typical astringent character and the colour to the tea infusion. The essential role of caffeine in the appreciation of tea does not need any explanation.

Various methods have been proposed for the preparation of a liquid tea extract suitable for vending machines. The methods proposed to prevent precipitation of the caffeine-tannin complex include raising of the pH, addition of substantial amounts of selected ions, mechanical removal of a part of the caffeinetannin complex and suspending of the remainder by stabilising agents (see e.g. B. Pat. 1,319,439).

The raising of the pH and the addition of selected ions promotes solubilisation of the tannins (polyphenols) and aids to the action of the stabilisers. However reconstitution of these extracts with hot water does not result in an acceptable product because the pH change influences the astringent character and the colour of the final brew. The fine aroma and flavour of the tea brew become unbalanced. Obviously, removal of creaming substances and even partial removal will result in a less desirable beverage.

A general object of the present invention is to prepare a tea extract which can be mixed with hot water to produce a high quality hot tea beverage which is clear and sparkling and has essentially the same flavour as a freshly prepared tea brew. Uner concentrated tea extract we understand here products which can be obtained by extracting black tea with hot water, containing 5-25% of solids.

A more specific object of the invention is to prepare a tea extract in which all the tea-extract components like caffeine and the tannins are retained in suspension by the action of a stabilising agent. Also when the concentrate is chilled or deep frozen and defrosted.

A further important requirement when the extract has to be used in vending machines is that the viscosity must not be raised so much that the accuracy of dosing the extract is substantially impaired.

According to the invention stabilisation of tea extracts, in the sense as defined above is obtained by adding to the extract sufficient quantities of a stabiliser or mixtures thereof and thereafter keeping the mixture under specific conditions of temperature and time.

Specifically the process comprises adding to the extract stabilising quantities of a suitable gum or mixture of gums and thereafter keeping the mixture of gum(s) and extract during a sufficient time at an elevated temperature before cooling to effect stabilisation.

A good stabilisation effect without the necessity of taking recourse to the objectionable practice of changing the pH or adding salts was e.g. obtained by the use of the microbial fermentation product xanthan gum, well known in the food industry for its excellent suspending properties. However in that case, even if small amounts of less than 1 gram gum per 100 ml extract were added, the viscosity of the liquid became so high that the accuracy of dosing in a dispensing machine was impaired. It was found that carragheenans were particularly suitable to obtain a good suspending effect without substantial viscosity increase. To the tea extract stabilising quantities of a carragheenan are added and thereafter the mixture is kept during a sufficient time at an elevated temperature. Preferably the temperature should be at least 60° C and the time at least about 1½ minutes.

In a preferred embodiment of the invention 0.1-1% of carragheenan is used and more specifically 0.15-0.35%. Conveniently the carragheenan is added in the form of a hot stock solution of 1-5%.

Particularly good results were obtained with iota-carragheenan. Carragheenans, vernacular "irish moss", are the gums extracted from certain seaweeds. Kappa and lambda carragheenan are normally extracted from Chondrus crispus and iota-carragheenan from Euchema spinosum. They are marketed under various trade names. The complex structures are discussed e.g. by Mueller G. P. and Ries R. A. (1967); Current structural views of red seaweed polysaccharides. Proc.: "Drugs from the sea", conference, Univ. Rhode Island, Kingston R.I. Aug. 28-29.

The extracts according to the invention may be canned, or distributed in chilled or deep frozen condition, they may also be (freeze) dried to produce "instant tea" powder.

The invention comprises also tea extracts manufactured according to the process described above. The process embodies a manner to obtain tea concentrates without withdrawing or changing any of the components of the tea. Therefore the invention also comprises quite generally tea extracts consisting exclusively of: substantially all the non water components of a natural tea brew, stabilizing quantities of a suitable gum or mixture of suitable gums and water, and as the case may be a preservative.

The invention may be better understood in the light of the following examples, but is is obviously not limited to the specific processes illustrated herein.

EXAMPLE 1

Black tea (700 g) was placed on a filter paper in a Büchner funnel (30 cm). The funnel was mounted on a suction flask of suitable capacity. Hot water (95° C, 4 liters) was poured over the tea in two separate aliquot portions, while vacuum was applied to the suction flask by means of a water aspirator. The hot tea extract was thus drawn into the flask. 2240 cc tea extract having a total solids content of 7.4% was produced. The pH of the tea extract was 4.9.

400 cc of the hot extract obtained were poured into the beaker of a Waring Blender. The stirrer was run at high speed while 1.0 gram Gelloid J (a iotacarragheenan manufactured by Marine Colloid Inc.) powder was added gradually into the vortex which was formed. The extract was aerated under vacuum, poured into a glass jar and placed in a refrigerator (+4° C).

The creaming substances in the extract did not sink to the bottom of the jar, but remained in stable suspension for more than three months. When 7 cc of the extract were added to 100 cc of hot water, a clear tea brew of natural colour was obtained.

EXAMPLE 2

In this case Genuvisco J (a carragheenan manufactured by Hercules Inc.) was used. The carragheenan was added from a concentrated stock solution into the warm tea extract. The resulting product was similar to that of example 1 with respect to the stability against creaming. The reconstituted tea brew had a well balanced aroma and flavour.

EXAMPLE 3

In this case a mixture of 1 part Gelloid J and 2 parts sodium alginate (manufactured by SIGMA U.S.A.) was used. The concentration of the gum mixture in the tea extract was 0.75% and it was incorporated into the extract as in example 1 with similar results.

EXAMPLE 4

Black tea (22.4 kg/h) was extracted in a countercurrent extraction equipment. The tea extract obtained (41.7 kg/h) had a total solids content of 14.6%. The pH was 5.0.

The tea extract was blended in-line with a carragheenan solution (Gelloid J. 2.3%) at a mass ratio 8 : 1.

The mixture was heated to 75° C in a plate heat exchanger. After a holding time of 5 minutes, the cream- stablised extract was cooled in a plate exchanger to 6° C. The extract was canned and frozen.

After thawing the tea extract was dispensed from an automatic dispensing machine. No precipitation in the valves or in other parts of the machine was observed.

When 4.5 cc of the concentrate were mixed with 100 cc hot water, a clear, well coloured tea drink was obtained, which had essentially the same aroma and flavour as freshly brewed tea.

I claim:

1. Process for stabilization of tea extract for preventing sedimentation of "creaming" substances on chilling and/or during storage at cold temperatures, the extract being stabilized without substantial viscosity increase so that it is capable of being used in automatic dispensing machines without impairing the accuracy of dosing, the process avoiding removal of creaming substances, or changing the natural pH of the extract, the process consisting essentially of:
   a. extracting a tea extract from tea with hot water; and
   b. mixing the tea extract at a temperature of at least about 60° C for at least about 1½ minutes with an effective stabilizing amount of carragheenan for preventing creaming on cooling of either the extract or a diluted tea drink made therefrom and also effective to provide an extract that is stable without substantial increase in viscosity.

2. Processing according to claim 1 whereby the concentration of the tea extract is between 5–25% and the concentration of the carragheenan between 0.1 and 1%.

3. Process according to claim 1 whereby the concentration of the tea extract is between 8–15% and the concentration of the carragheenan between 0,15–0,35%.

4. Process according to claim 1 whereby the carragheenan is iota-carragheenan.

5. A stabilized tea extract having suitable viscosity for use in automatic dispensing machines, the extract manufactured according to claim 1.

* * * * *